United States Patent [19]

McCullough et al.

[11] Patent Number: 4,663,103
[45] Date of Patent: May 5, 1987

[54] APPARATUS AND METHOD OF EXTRUSION

[75] Inventors: Robert W. McCullough, Riverside, Conn.; Clarence A. Peoples, Rockwell; Maurice J. Sacks, Denver, both of N.C.; Ronald L. Adams, Mahwah; Klaus Kapfer, Ramsey, both of N.J.; Graham M. Talbott, Concord, N.C.

[73] Assignee: Collins & Aikman Corporation, New York, N.Y.

[21] Appl. No.: 521,749

[22] Filed: Aug. 9, 1983

[51] Int. Cl.$^4$ .................................................. B29C 47/40
[52] U.S. Cl. ............................ 264/40.4; 156/244.27;
264/102; 264/171; 264/211.23; 264/349;
366/85; 366/88; 425/203; 425/204
[58] Field of Search ................... 264/101, 171, 176 R,
264/349, 102, 40.4; 425/203, 204, 145; 366/88,
85; 156/244.27

[56] References Cited

U.S. PATENT DOCUMENTS

| | | | |
|---|---|---|---|
| 3,077,428 | 2/1963 | Heuser et al. | 264/176 R |
| 3,239,878 | 3/1966 | Ahlefeld, Jr. et al. | 264/211 |
| 3,252,182 | 5/1966 | Colombo | 264/211 |
| 3,334,163 | 8/1967 | Gilbert | 264/211 |
| 3,376,603 | 4/1968 | Colombo | 264/211 |
| 3,444,283 | 7/1969 | Carlson, Jr. | 264/176 R |
| 3,477,698 | 11/1969 | Smith et al. | 264/211 |
| 3,522,342 | 7/1970 | Nungesser et al. | 264/211 |
| 3,725,340 | 4/1973 | Erdmenger et al. | 264/176 R |
| 3,843,757 | 10/1974 | Ehrenfreund et al. | 264/53 |
| 3,883,631 | 5/1975 | Murray | 264/210 R |
| 3,903,234 | 9/1975 | Ikeda et al. | 264/210 R |
| 3,904,719 | 9/1975 | Fritsch | 264/176 R |
| 3,963,679 | 6/1976 | Ullrich et al. | 264/211 |
| 3,984,509 | 10/1976 | Hall et al. | 264/176 R |
| 4,051,212 | 9/1977 | Grigat et al. | 264/211 |
| 4,065,532 | 12/1977 | Wild et al. | 264/211 |
| 4,100,244 | 7/1978 | Nonaka | 264/211 |
| 4,113,822 | 9/1978 | Takiura et al. | 264/349 |
| 4,117,195 | 9/1978 | Swarbrick et al. | 264/211 |
| 4,118,365 | 10/1978 | James et al. | 264/211 |
| 4,127,635 | 11/1978 | Gauthier | 264/101 |
| 4,136,132 | 1/1979 | Poole | 264/211 |
| 4,164,385 | 8/1979 | Finkensiep | 264/211 |
| 4,191,798 | 3/1980 | Schumacher et al. | 428/95 |
| 4,205,030 | 5/1980 | Menshutin et al. | 264/211 |
| 4,212,543 | 7/1980 | Bersano | 425/204 |
| 4,242,395 | 12/1980 | Zuckerman et al. | 428/95 |
| 4,250,132 | 2/1981 | Beach | 264/211 |
| 4,251,477 | 2/1981 | Christian | 264/211 |
| 4,259,277 | 3/1977 | Hill | 264/75 |
| 4,261,946 | 4/1981 | Goyert et al. | 264/211 |
| 4,263,196 | 4/1981 | Schumacher et al. | 260/336 |
| 4,302,409 | 11/1981 | Miller et al. | 264/211 |
| 4,320,041 | 3/1982 | Abe et al. | 264/176 R |
| 4,335,034 | 6/1982 | Zuckerman et al. | 524/423 |
| 4,350,655 | 9/1980 | Hoge | 264/211 |
| 4,351,790 | 9/1982 | Hochstrasser et al. | 264/211 |
| 4,372,736 | 2/1983 | Gooch et al. | 425/149 |
| 4,379,190 | 4/1983 | Schenck | 524/423 |
| 4,409,167 | 10/1983 | Kolouch et al. | 264/349 |
| 4,508,771 | 4/1985 | Peoples et al. | 428/95 |

OTHER PUBLICATIONS

"Justifying an In-House Compounding Operation", Polymer Processing News, vol. 12, No. 1, 1981.
Luwa Corporation, Improving Extruder Performance, The Thermorex Way, Nov. 1980.
Compounding Extruders for Plastics, KK/ES-A, Jan. 1976.
Thin-Screw Extrusion Technology, Jan. 1979.
ZSK 30 Twin-Screw Laboratory Extruder, 1980.
Polymer Processing News, Justifying an In-House Compounding Operation, First Quarter, 1981.
An Analysis of Twin-Screw Extruder Mechanisms as reprinted from Advances in Plastics Technology, Apr. 1981.
Food Technology, Twin Screw Mixing and Cooking Extruder Continua, Apr. 1982.
Plastics Compounding, Update on Continuous Compounding Equipment Part II: Twin-Screw and Specialized Compounders, Nov./Dec. 1982.
Luwa Corporation, Improving Extruder Performance, The Thermorex Way, Nov. 1980.
Plastics Technology, Continuous Compounding of Engineering Plastics, Sep. 1981.

Primary Examiner—Jan Silbaugh
Assistant Examiner—Mary Lynn Fertig
Attorney, Agent, or Firm—Bell, Seltzer, Park & Gibson

[57] ABSTRACT

Apparatus and method are provided in a system for continuously feeding disparate materials into a compounding extruder for the inline sheet extrusion of a highly filled thermoplastic material having at least about 65 percent by weight of filler. The apparatus and method of the present invention are particularly suitable in conjunction with the continuous lamination of the inline sheet extruder product with carpet.

14 Claims, 4 Drawing Figures

APPARATUS AND METHOD OF EXTRUSION

BACKGROUND OF THE INVENTION

1. Field of the Invention

This invention relates to a system and process for the continuous inline compounding and extrusion of highly filled, thermoplastic blends. The highly filled blends may be used in the fabrication of compliant carpet backings for both automotive and contract carpet.

2. Information Disclosure

The backsizing of carpets for automotive and contract carpet applications has heretofore independently developed due to the specific requirements for each which were thought to render the fabrication of automotive carpet incompatible with that of contract carpets.

The requisites for the original automotive carpeting were that it had to be moldable, abate noises, have good high temperature aging and good low temperature cracking characteristics, and some flexibility. Compliant blends were not a prerequisite for automotive carpeting and moreover were incompatible with continuous conventional compounding and application methods. The tendencies now, however, are toward more compliant automotive carpeting.

On the other hand, contract carpet requires very different properties and, for example, requires very compliant backing materials to be laminated with compatible precoat blends. which function to yield tuft lock, abrasion resistance, dimensional stability, and other properties either superior to or not required of automotive carpeting.

The systems and blends finding the most application in the contract carpet field have essentially been limited to PVC plastisols. While these blends have many limitations regarding their compounding and application to carpet, they had the advantage of being very versatile in that a wide range of properties and characteristics could be compounded into such blends for both backing and precoating carpets to obtain the above mentioned superior properties without sacrificing the continuity of the process or the ability to form good laminates, including carpeting having dimensional stability. These PVC plastisols could be filled yet incorporated into continuous backing operations since they were liquid at room temperature and fused or solidified upon application of heat. PVC plastisol blends as applied to automotive carpets, however, have many disadvantages, and while such are moldable, in the context of automotive carpet processing, they are ill suited and not practicable since temperatures in excess of acceptable limits are required causing problems such as shrinkage, smoking, and the like.

PVC blends have therefore not been utilized in automotive applications which have typically utilized blends that are solid at room temperature and must be heated and/or worked prior to being suitable for application to carpet. The development of the prior art as it pertains to suitable blends for modern automotive carpeting backings has been set forth\from the standpoint of two entities in U.S. Pat. No. 4,191,798 to E.I. DuPont de Nemours and Company and U.S. Pat. No. 4,242,395 to J.P. Stevens & Co., Inc.

The referenced patents claim highly filled blends in conjunction with use to back carpets, claiming presence of filler from 50 to 90 percent (DuPont) and 60 to 90 percent (Stevens); the former essentially containing 4 to 12 percent oil and 5 to 50 percent co-polymer ethylene vinyl acetate (e.g. EVA), the latter, 1 to 15 percent plasticizer (e.g. oils), 1 to 10 percent nonvulcanized elastomeric resin and 5 to 25 percent co-polymer ethylene vinyl acetate. While each patent suggests application to carpet by extrusion, neither of these patents teach the manner in which the blends are to be prepared for extrusion or the form of the materials to be extruded, the manner in which they are extruded, design of the extruder, and the like. Presumably one is left to conventional fabrication and extrusion techniques.

Conventional extrusion techniques are generally directed to the formation of an intermediate stage plasticized granule or pellet. The extrusion art suggests that the extrusion of products such as pipe and the like directly from powdered plastic and even some pelletized plastic often results in the formation of voids and/or pores in the product. Such is said to be caused by various volatile constituents, entrapped moisture, and the like. Some of the art has therefore adopted rather elaborate means to dry the blended components during compounding and extrusion and/or to pretreat various components prior to extrusion or utilize, for example, elaborate venting means during extrusion to try to minimize the presence of volatiles in feed materials or to extract volatiles during extrusion. It is believed such methods are not conducive to high volume continuous commercial operations and notwithstanding elaborate preventive means have generally resulted in unacceptable extrudate, and complicated venting techniques, the latter techniques having been highly susceptible to having plasticated extrudate flow into the venting area with other concomitant undesirable results.

Commercial requirements of high volume extrusion have thus generally required formation of the intermediate stage plasticated granule or pellet prior to extrusion. As recited in U.S. Pat. No. 4,127,635, properly compounded pellets have many advantages over the pulverant form in being more dense, more free flowing, less likely to be contaminated by foreign matter, moisture and the like. The pellets however have to be specially compounded so they remain free flowing during shipment and/or inventorying or storage prior to their being extruded into the final product. This intermediate stage has therefore limited the types of blends suitable for commercial use since, for example, compliant and/or soft blends, tacky blends, and the like would not remain free flowing and therefore such compositions could not be considered for use in conventional commercial extrusion systems.

Still yet a further complicating factor is that economics now require the use of relatively inexpensive blends requiring the addition of more and more filler materials. Fillers particularly conducive to forming carpet backing material are essentially pulverized rock or marble such as calcium carbonate and the like. U.S. Pat. No. 4,191,798 indicates highly filled blends do not flux in Banbury Mixers, suggesting use of special additives and the like in order to even compound such blends. Moreover, the extrusion of highly filled blends normally raises extrusion temperatures to intolerable levels, often above the degradation temperatures of suitable polymers used to make the blend. Additionally, more volatiles and/or moisture tend to be introduced by and/or entrapped in such blends, very often resulting in unsuitable extrudate and return of car loads of such blended materials for recompounding, drying, and the like.

Some authorities such as Werner & Pfleiderer Corporation have suggested that it is now justifiable to have in-house compounding operations, which would eliminate various expenses (e.g. customer compounding costs, shipping, related costs, etc.) in conjunction with operations relating to the intermediate stage approach (e.g. pelletizing of blends prior to extrusion). They suggest a two-stage operation consisting of a co-rotating, twin-screw extruder to provide a flexible compounding system in combination with a single-screw machine (melt pump) for use in conveying highly plasticized materials from compounding extruders to generate sufficient pressures for feeding downstream equipment such as a sheet die. However, these techniques have been directed to highly plasticized materials and have not heretofore been directed to the continuous compounding and extrusion of highly filled thermoplastic blends, generally in excess of about 65 percent rock-like fillers such as calcium carbonate and the like. The present invention evolved only after various innovative techniques were developed by Collins & Aikman in collaboration with Werner & Pfleiderer Corporation to overcome the numerous problems associated with the inline compounding and extrusion of such highly filled blends.

OBJECTS OF THE INVENTION

It is therefore an object of the present invention to provide a compounding extruder for the continuous compounding of highly filled thermoplastic blends.

Another object is to provide a system for continuously feeding disparate materials into a compounding extruder for the inline sheet extrusion of a highly filled thermoplastic elastomeric backing material.

Another object is to provide such a continuous system which eliminates the so-called intermediate stage approach and can be utilized with very compliant, soft, tacky, etc. blends heretofore incompatible with continuous high volume inline extrusion processes.

It is yet a further object to provide such a system whereby the highly filled thermoplastic elastomeric blends are mixed, melted, and dispersed within the compounding extruder while maintaining the temperature of the materials within the extruder below certain degradation and/or volatization temperatures of the essential materials.

Yet a further object is to mix, melt, and disperse the materials of the blend while maintaining the temperatures of the materials within the extruder at below about 400° F. when the blend contains EVA's (ethylene vinyl acetates) and more preferably below about 380° F. since with backings requiring good elongation properties, effective amounts of stearates, which tend to volatize at temperatures over 380° F., become essential to the blend.

It is a further object to process such highly filled blends having at least about 65 weight percent filler, utilizing effective amount(s) of processing aid(s) fed into the extruder at effective location(s) to permit mixing, melting, and dispersion of the blend at controlled temperatures without plugging and/or stoppage of the extruder.

A further object is to provide a process whereby the disparate materials forming a highly filled blend are gravimetrically fed to a continuously operating extruder at a rate substantially equal to the gravimetric rate at which extrudate is produced by said extruder in sheet form.

Still yet another object is to provide a system which permits maximum control over the inventorying, mixing, and extrusion of the disparate materials and the related processing conditions to permit the maximum flexibility in balancing processing efficiencies, economies of operation through adjustments in formulations to produce and maintain specified physical properties and end product quality.

Another object is to provide such a system which can be utilized for the inline extrusion onto the backs of both automotive and contract carpets.

Still yet a further object is to cure the disadvantages and problems set forth hereinbefore.

SUMMARY OF THE INVENTION

The present invention provides a system and process for continuously feeding disparate materials into a compounding extruder for the inline sheet extrusion of a highly filled thermoplastic elastomeric material.

Feed means are provided for inventorying and continuously delivering the disparate materials in predetermined proportions to the extruder. The extruder has extrusion means for mixing, homogenizing, and dispersing the disparate materials forming a melt. The melt when extruded through a sheeting die has a melt strength sufficient to properly be applied to the back of the carpet and to maintain its gauge as determined by the sheeting die.

The compounding extruder is designed to accept various disparate materials at a feed zone from which they are conveyed for further processing in the extruder. Control means are provided to insure that the extruder and feed means act cooperatively to maintain the disparate materials in starve fed condition throughout the conveying zone from which the materials are progressed into a zone comprising first and second kneading zones. Critical to the functioning of these zones is the addition of an effective amount of processing oil just prior to or just after the materials enter the kneading zones. Thereafter, the materials pass through a degassing zone and then through a pumping zone which forces same through a die. The pumping zone functions to develop sufficient through-put without creating intolerable back pressures in the preceding zones or on the thrust bearings of the extruder.

The blends of disparate materials suitable for use in the system and process of the present invention are characterized as highly filled thermoplastic elastomeric blends and are preferably extruded and applied to the back of carpet to form a compliant precisely gauged backed carpet. Various blends utilized to fabricate such carpets set new standards in carpets, and particularly, can be utilized to continuously fabricate very compliant carpet backings, inline, heretofore unattainable using conventional extrusion methods. Blends having pellet cohesive strengths of 1.35 or less can now be fabricated whereas prior to the present invention, such were not practicable in a system for the inline sheet extrusion of highly filled thermoplastic elastomeric backing material for continuous lamination with carpet. The availability of such compliant blends for use in such a system has now rendered the system and process of the present invention practicable for fabrication of contract carpet.

The inline compounding extrusion of such very compliant blends under controlled conditions has produced a compliant highly filled thermoplastic backing material which is gauged by the sheeting die and therefore believed to produce a substantially stress relieved backing material which is conducive to the fabrication of dimensionally stable contract carpet which may be cut into tiles.

This summary is meant to provide a brief overview of the present invention and some of its applications. The present invention and its significance will be further understood by one skilled in the art from a review of the complete specification including the description of the drawing figures and the preferred embodiment, the drawings and the claims.

BRIEF DESCRIPTION OF THE DRAWING FIGURES

DESCRIPTION OF THE PREFERRED EMBODIMENT

It has now been found that a system, including a compounding extruder, can be utilized to continuously compound disparate materials for the continuous inline sheet extrusion of highly filled thermoplastic backing materials for continuous lamination with carpeting. The present invention provides systems, processes and compositions for the fabrication of compliant highly filled thermoplastic materials.

Figure 1:
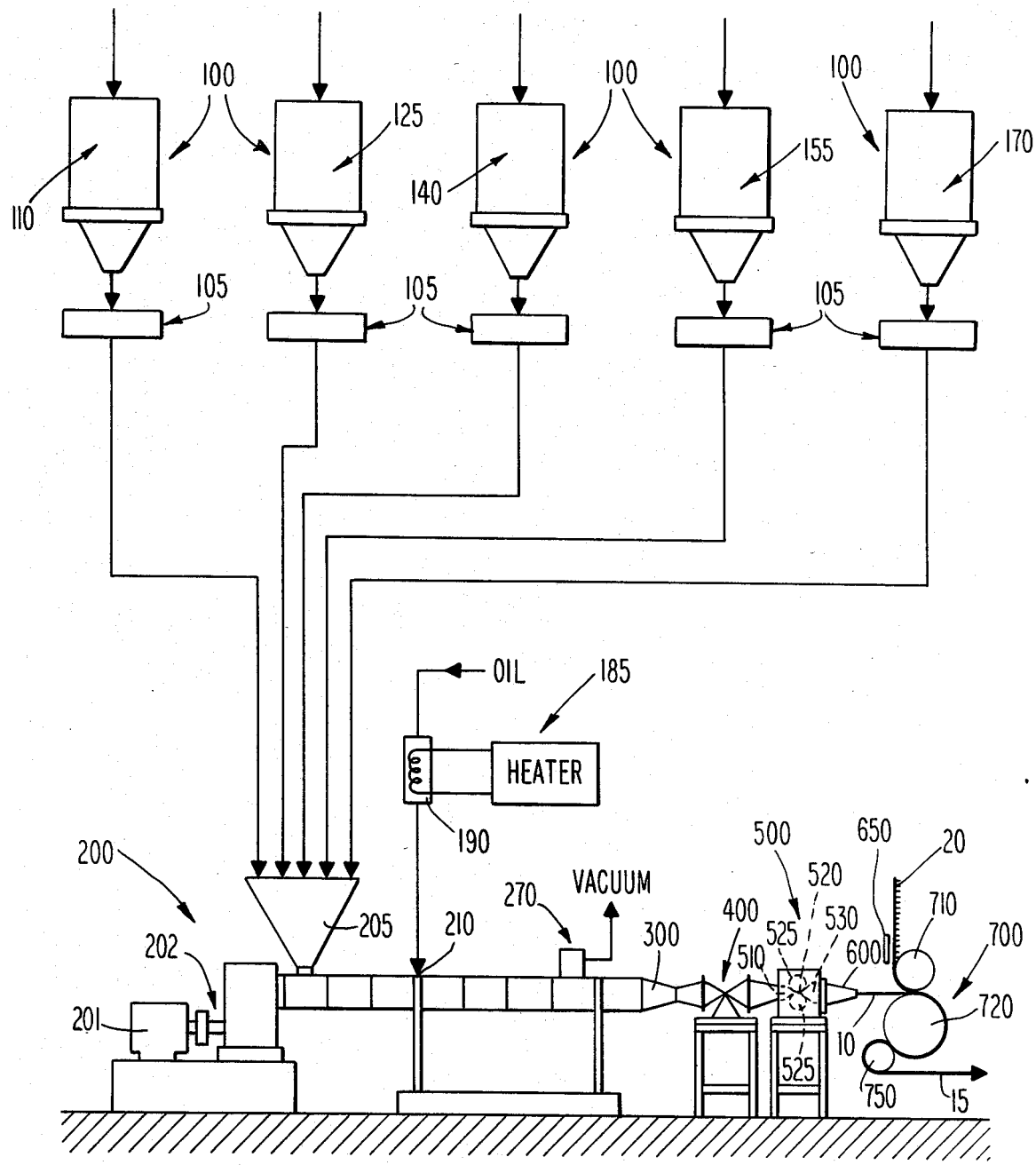
FIG. 1 is a schematic drawing illustrating an embodiment of the system of the present invention.

The preferred system and method are depicted in FIG. 1. As shown, individual feeders 100 store and continuously feed disparate materials individually to compounding extruder 200, some at feed hopper 205 and some at feed port 210. The materials are continuously progressed through extruder 200, through adaptor 300, into diverter valve 400, into gear pump 500 and extruded through die 600 forming sheet 10 which is continuously laminated to carpet 20 by passing the foregoing through roll system 700 to form a backed carpet product 15.

In the preferred embodiment, K-tron feeders 100 have gravimetric or loss-in-weight type feeders (generally designated 105) which continuously meter each of the free-flowing ingredients into extruder 200 through feed hopper 205. Individual feeder 110 contains a polymeric resinous material, feeder 125 contains an elastomeric material which may include a thermoplastic rubber, feeder 140 contains a stearate, feeder 155 contains an inorganic filler, feeder 170 optionally contains scrap which may include ground edge trim from the laminated carpet, scrap from subsequent molding operations and the like, and system 185 delivers processing oil to heat exchanger 190 which heats same prior to delivery to extruder 200 through feed port 210. Although five feeders are shown, it is understood that any number of feeders may be employed to deliver the disparate materials to extruder 200 consistent with compounding and extrusion requirements as outlined hereinafter. Feeder 140 is positioned centrally of feeders 100 to ensure that substantially all of the stearate component is delivered directly into extruder 200 without impinging on feed hopper 205.

In the preferred embodiment, particularly compliant backing compositions can be compounded and extruded inline by virtue of the present invention. These compositions broadly include thermoplastic elastomeric blends which are highly filled, generally containing at least about 65, preferably from about 65 to 85, weight percent inorganic filler such as calcium carbonate, barium sulfate, aluminum trihydrate and the like. Organic fillers such as wood flour are likewise acceptable. The compositions of the present invention are formed from disparate materials consisting essentially of a polymeric material and filler which materials can be separately shipped and stored, remaining free flowing, and which can be continuously formed into a blend for the inline extrusion of a sheet for continuously backing carpet. More specifically, the blend has a cohesive strength of at least about 1.35 and a melt strength value of not more than about 0.15 and preferably not more than about 0.10 (as more fully set forth below). The cohesive strength is the flow function of a composition as determined by plotting the unconfined yield strength $f_c$, PSF against the major consolidating pressure $\sigma$, PSF and determining the inverse slope of the line approximating such a plot. The aforementioned test indicates that blends to be processed into an intermediate stage and having a cohesive strength less than or equal to about 1.35 were heretofore unacceptable for silo storage and use in conventional commercial processes. It has been found that materials suitable for shipment in rail cars should have cohesive strengths of greater than 1.70. Various compositions and their cohesive strength as more fully set forth in Examples I through VI. Derivation of cohesive strengths is more fully set forth in Bulletin No. 123 of the Utah Engineering Experiment Section entitled *Storage And Flow of Solids*, by Andrew W. Jenike, April 1980, Vol. 53 No. 26, which is incorporated herein by this reference. The aformentioned values were determined from blends having an average particulate filler of blends of from about 4 to 6 mm in size (without tailings) and a 5618 cubic foot silo having a height of 65 feet and a diameter of 12 feet and a cone having a 60° slope with a B-2 flow surface made of stainless steel. The rail car cohesive strength value assumed standard rail car construction.

One example of a highly filled polymeric material includes from about 10 to 35 weight percent of a polymeric material which accepts such high filler levels and has a melt strength as specified above. The polymeric material may include, for example, co-polymers of ethylene and unsaturated esters of lower carboxylic acids such as vinyl esters and/or lower alkyl acrylates in admixture with an elastomeric material such as for example thermoplastic elastomers and/or rubbers, including olefinic elastomers such as co-polymers of ethylene and propylene and the like. When such co-polymers are admixed with the elastomers and/or rubbers, the latter may be present in the range of from about 4 to 18 weight percent. It has likewise been found that various polymers of ethylene vinyl acetate ("EVA") which tend to be elastomeric may be utilized without addition or admixture with a separate elastomeric material. For example, a copolymer of ethylene and an unsaturated ester of the lower carboxylic acid wherein such ester is greater than 30 weight percent and preferably between about 35 and 50 weight percent of vinyl acetate. Of course various polymeric resinous materials are possible consistent with the specified carpet backing requirements, the processing parameters, and the like as will be evident from the specification.

Figure 2:
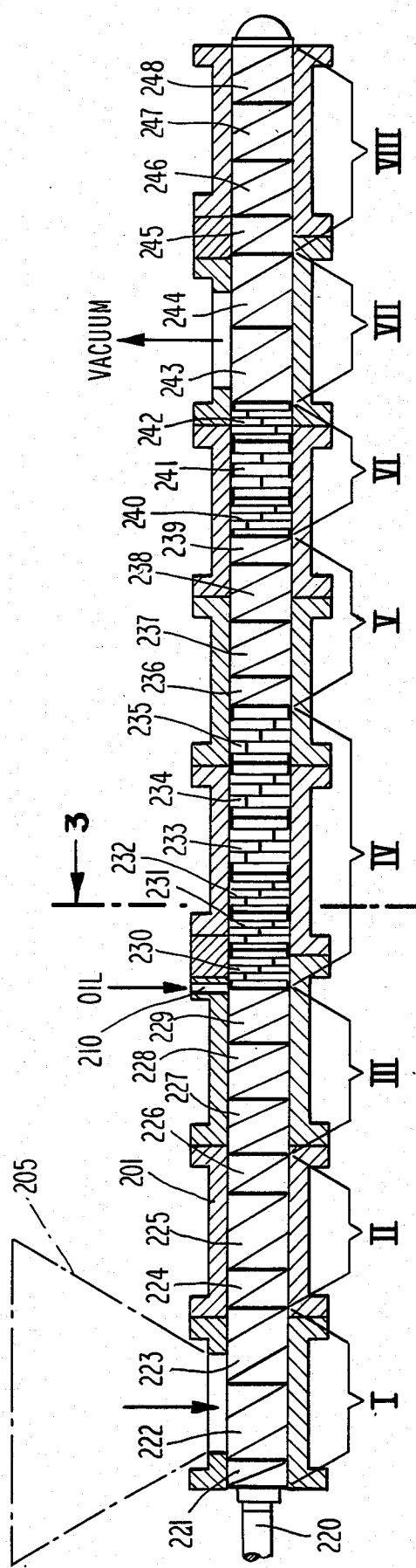
FIG. 2 is a schematic section of the extruder illustrating a screw design of the present invention.
Figure 3:
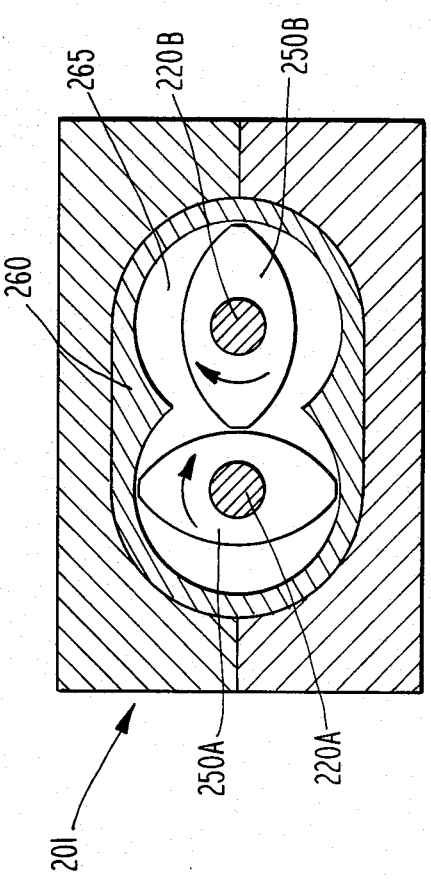
FIG. 3 is a local section taken along the line 3—3 of the extruder of FIG. 2.

As is best seen in FIGS. 2 and 3, extruder 200 is a twin screw co-rotating intermeshing extruder comprising eight distinct zones designated I through VIII further comprising distinct rotatable elements 221 through 248 mounted on keyed shaft 220 to rotate within extruder barrel openings 265 through a diameter of 130 mm. A 700 HP motor 201 is geared down by twin output gear reducer 202 to yield a 350 rpm maximum screw speed for shafts 220 (see FIG. 3) and the distinct sections keyed to shafts 220. In the preferred embodiment, controller 202 is a four-stage reduction gear transmission having a thrust bearing assembly to accommodate the thrust of screw shafts 200 and back pressures sufficient to extrude the backing material through sheet die 600. While only one shaft 220 is shown with corresponding section 221 through 248 (FIG. 2), in the preferred embodiment, controller 202 rotates a second shaft 220B having sections identical with sections 221 through 248 of shaft 220A (FIG. 3), all in a manner causing shafts 220 and sections 221 through 248 to co-rotate, the latter sections in intermeshing relationship with each of the corresponding sections of each of the two shafts 220A and 220B, with kneading block sections 230 through 235 and 240 through 242 of shaft 220B being disposed 90° to the corresponding kneading blocks of shaft 220A. As is best seen in FIG. 3, corresponding kneading blocks, generally designated as 250, are two-lobed and disposed 90° from each other. In the preferred embodiment liner 260 forms a part of extruder-housing 201 forming extruder barrel openings 265.

In the preferred embodiment, zones I, II and III basically comprise conveying screws 221 through 229 for progressing the disparate materials initially fed into zone I of extruder 200, away from zone I and into zones II et seq. Zones I through III tend to disperse the ingredients without melting same while maintaining, cooperatively with feeders 100, the disparate materials in starve fed condition.

Zone I is cooled so that there is no melting of the ingredients and no plugging of the extruder by the ingredients. Zones II and III are controlled together by a 36 Kw hot oil heat exchanger system (not shown) for heating and cooling these zones, normally at a temperature in the range of between about 140° to 230° C. It has been found that the temperature in these zones must preferably be maintained at substantially stable levels; any decreasing of temperatures generally indicating subsequent plugging and/or shut down of extruder 200. Even more particularly, temperatures must be maintained above about 120° C. to avoid plugging and/or shut down. It has been found that an effective amount of the stearate component should preferably be introduced to the extruder 200 as early as practical, preferably in feed hopper 205, and most preferably in a manner such that it is enveloped by the other disparate materials without substantial feeding and contact with extruder elements. The dispersion of the stearate within the blend mitigates against increases in the temperature of the materials within extruder 200 as well as functioning to lessen the power necessary to compound and/or progress the materials within extruder 200. It has also been found that the stearate increases the elongation of the extrudate from unacceptable levels of about 10 percent to about 200 to 300 percent.

As depicted in FIG. 2, zone I comprises three screw sections. Section 221 consists of a 120/60 screw segment, section 222 consists of a 160/160/SK screw, and section 223 consists of a 160/160/SK screw. The designation "120/60", indicates that the pitch of screw section 221 is 120 mm and its length is 60 mm. Theoretically, one complete revolution of section 221 with a 120/60 screw will yield an axial travel of 120 mm. The "SK" designation refers to the fact that the screws have been undercut, for example, the leading flight and the bottom of the crest are scooped out to change the vector at which the material is progressed, as is known in the art. Additionally, the free volume of the screw is increased, further permitting sections 222 and 223 to more efficiently axially displace or progress the feed materials away from feed zone I. Feed hopper 205 feeds the disparate materials centrally of zone I and centrally of the co-rotating shafts 220 at about the nip or place of intermeshing.

After leaving zone I, the materials are progressed into zone II comprising three screw sections 224, 225, 226. Section 224 consists of a 160/80/SK-N screw segment, section 225 a 160/160 screw segment and section 226 a 160/80 screw segment. The meaning of these designations corresponds with those set forth hereinbefore. The "SK-N" designation refers to a screw which has been undercut, however, the screw is designed to make a normal transition with the succeeding screw section, as is known in the art. Succeeding zone III comprises three screw sections 227, 228 and 229, all consisting of 120/120 screw segments.

After leaving zone III, the materials are progressed into zone IV, where they are kneaded by kneading section blocks 230 through 235, which sections comprise, respectively, three segments of KB/45°/5/80 (230, 231 and 232) followed by three segments of KB/45°/5/120 (233, 234 and 235). The designation "KB/45°/5/80" indicates 5 kneading block (KB) disks staggered at a 45° angle to each other to form an 80 mm long block. The materials are then progressed through conveying zone V consisting of a 120/60 screw (236) followed by two 120/120 screw segments (237 and 238) followed by a 120/60 screw segment (239), to a second set of kneading blocks in zone VI, consisting of a KB/45°/5/80 (240), followed by a KB/90°/5/120 (241), followed by a KB/45°/5/80/LH (242).

In zones IV, V and VI, the disparate materials from zones I through III are melted, homogenized, and are dispersed throughout the melt. Critical to these operations is the prior addition of an effective amount of processing oil. It has been found that the addition of oil to the highly filled blends of the present invention was critical to the proper function of the elements in these zones to melt and disperse the disparate materials. In addition, it was found that extruder 200 will plug and/or freeze without addition of an effective amount of oil causing extruder stoppage. In the preferred embodiment, an effective amount of processing oil heated to temperatures of about 150° F., is added to extruder 200 at port 210. It is believed critical that the oil be added just prior to or just after the kneading and/or shearing and/or melting of the materials which is effectuated in zones IV through VI. Addition of the oil in zone I was found to cause surging and create other processing problems. The stearate component introduced into extruder 200 is generally temperature sensitive, and failing to accurately control the extrusion temperatures tend to make that component degrade and/or volatize affecting the integrity and/or quality of backed carpet 15. Thus the materials within extruder 200 should be maintained below degradation temperatures of the essential disparate materials and preferably below about 400° F., and more preferably below about 380° F. On the other hand, the integrity and/or quality of extruded backing material 10 and backed carpet 15 are likewise affected by the extent of dispersion of the disparate materials throughout the blend, which necessarily causes the disparate materials to increase in temperature during compounding in extruder 200. Thus in order to obtain the requisite properties for the extrudate 10 and backed carpet 15, a careful balancing of composition, extruder design, temperature control and the like, are necessary. For example, it has been found that the filler and elastomeric materials should be dispersed throughout the extrudate and that the elastomeric materials should be substantially completely dispersed throughout same in order to impart the desired properties. The polymeric materials having elastomeric qualities have been found to be the most difficult to disperse and are believed to in addition to the fillers be most directly responsible for increasing temperatures during the compounding/extrusion process. The present invention has successfully balanced these parameters by correctly controlling the introduction of effective amounts of oil and stearate, as well as through proper extruder design, and the like. More particularly as the filler and elastomeric materials vary within the ranges of about 65 to 85 weight percent and 4 to 15 weight percent, respectively, an effect amount of oil is critical to the effective operation of the compounding extruder 200, which amount more particularly varies between about 2 and 10 weight percent.

In the preferred embodiment, it has been found that the various functions and conditions within zones I through VIII of extruder 200 interrelate with each other and thus must be designed to accomplish their desired functions without adversely affecting the conditions and/or functions of other zones. For example, zones IV through VI should be designed consistent with requirements for starve feeding and the progressing of the disparate materials through zones I through III, consistent with the critical temperature parameters of zones II and III, and the like, while functioning to melt, disperse and homogenize the materials at temperatures below their degradation temperatures and while cooperatively functioning to effectively permit volatization in zone VIII, as well as the effective progressing of same through the extruder to delivery and extrusion of same through die 600.

In the preferred embodiment zones IV through VI comprise an intensive kneading zone as defined by kneading sections 230 through 235, followed by a conveying zone defined by sections 236 through 239, followed by an intensive kneading zone sections 239 through 242. The left handed kneading section 242 causes a back flow of material. This back flow of material continues at least through section 241 which has its kneading blocks staggered at 90° and which acts as a neutral section in the sense that the material is not progressed through this section and into section 242 by action of section 241. The material therefore tends to reside in section 241 for a period of time permitting the disparate elements to be more fully dispersed and homogenized. The back flow of materials created by section 242 continues until the materials being progressed through extruder 200 create enough force to overcome the back flow created by elements 242. It is believed that this back flow in addition to further aiding in the dispersion and homogenization of the kneaded materials also assists in the venting in zone VII since, while it causes various sections within extruder 200 to fill extruder barrels 201 which helps the sections to melt, disperse and/or homogenize the blend, it functions to restrict the amount of material progressed into zone VII and thus tends to starve the zone to permit venting.

Zone VII is provided with a vent port opening (not shown) in communication with vacuum venting system 270 having a 220 CFM at 27.5 inches Hg vacuum vacuum pump having a condensate collection system (not shown). It has been found that some of the disparate materials, and more generally the filler, introduce moisture into the compounded materials while others introduce volatiles and/or moisture which greatly reduce the melt strength of the extrudate, generally to unacceptable levels. Extruder 200 of the present invention is thus operated to control the moisture content and/or volatiles consistent with the substantially horizontal extrusion of such materials through die 600 onto carpet 10. Venting zone VII in the preferred embodiment contains two screw sections 243 and 244 each containing 160/160 conveying screws. It has been found that the blend must be sufficiently vented such that the blend is essentially a void free extrudate. Generally the moisture content of the extrudate is essentially less than about 0.10 percent to produce such a void free extrudate.

Zone VIII receives the vented material from zone VII and aids to convey or progress same through extruder 200 while maintaining the temperature and other characteristics compounded into the materials in prior zones. Screw section 245 consists of a 160/80 screw segment while screw sections 246, 247 and 248 in zone VIII all consist of 120/120 screws segments. The material is then directed through transition section 300 to diverter system 400. Transition section 300 is an 8/0 transition and converts the "FIG. 8" type feed from the co-rotating extruder into a single barrel type feed. Diverter valve 400 is in fluid communication with gear pump 500, which is in fluid communication with sheeting die 600.

After extrusion of backing material 10, it passes through roll system 700, comprising drum 710, cooling drum 720 and stripping drum 750. In the preferred embodiment, drums 710 and 720 are gapped in a manner permitting carpet 20, which is generally precoated, and extrudate 10 to be contacted with each other to form an integral backed carpet without formation of a puddle at the nip. It has been found that gauging of the backed carpet by gauging the extrudate using sheeting die 600 is preferred. The present invention makes this possible by being able to substantially horizontally extrude the backing material at the specified melt strengths into the nip formed by drums 710 and 720 without distortion such as roping or sagging and the like. Cooling drum 720 functions to cool the backing material surface in contact with the drum surface to a temperature low enough to strip the backed carpet from drum 720 via drum 750 without damage or distortion of the gauged backing material, after which backed carpet 15 can be further processed consistent with the desired final product. In the preferred embodiment, the surface temperature of backing material 10 in contact with cooling drum 750 is cooled to a temperature of about 150° F. or less.

In the preferred embodiment, extruder 200 feeds the compounded materials into gear pump 500 rather than directly into sheeting die 600. Gear pump 500 comprises a suction zone 510, a compression zone 520 and a discharge zone 530. In the preferred embodiment compression zone 510 has a pair of rotating gears 525 having gear teeth (not shown). In operation, the compounded backing material from extruder 200 flows into the inlet cavity or suction zone 510 and is picked up by the teeth of rotating gears 525 which are helical gears measuring 140 mm in diameter and width. The material is then progressed into compression zone 520 wherein the backing material is impacted by the teeth into the gear teeth openings (not shown). The use of the rotating gears to pick up and force the materials through discharge zone 530 and through extruder die 600 permits high volumetric efficiency under low inlet velocity conditions, while at the same time reducing back pressures in extruder 200. It is believed this action further helps increase the melt stream pressure without substantial increase in temperature, thus preserving the quality of the backing material and maintaining same in substantially like form as at exit from extruder 200. In the preferred embodiment, the suction side, suction zone 510 is maintained at a pressure of less than about 100 psi, whereas the discharge side, discharge zone 530 is maintained at pressures which completely fill sheeting die 600; the extrusion rate is maintained at substantially the same gravimetric rate as the combined gravimetric feed rate of disparate materials into extruder 200. Preferably the pressure at the discharge zone is at least about 1000 psi and is maintained within the range of between about 1000 and 4500 psi to maintain the material throughout the width of sheeting die 600.

Figure 4:
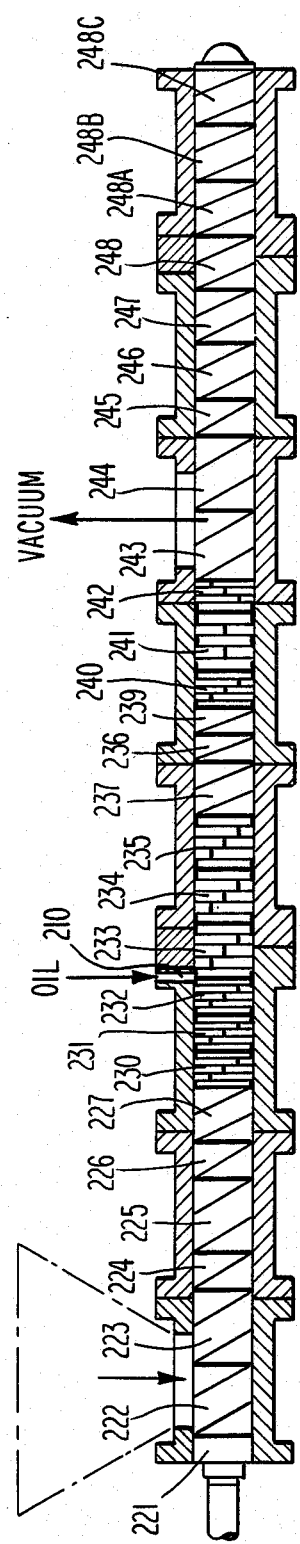
FIG. 4 is a schematic section of the extruder illustrating yet another screw design embodiment of the present invention.

Another embodiment is depicted in FIG. 4. Here, extruder 200 is utilized to pump the material directed through diverter valve 400 and into die 600 to form extrudate 10. In this embodiment, zones IV through VIII have been moved toward feed zone I replacing sections 228 and 229 which have been eliminated. Zones I through VIII and their corresponding sections still function as described hereinbefore with respect to the embodiment of FIG. 2, however zone VIII has been extended by the addition of three additional 120/120 conveying sections 248A, B, and C which together with the preceding sections function to more efficiently pump the material through sheeting die 600.

As indicated in the preferred embodiment, sheeting die 600 is a flexible lip die having die bolts (not shown) spaced at predetermined intervals, throughout the width of sheeting die 600. The die bolts function to variably adjust the die lip opening and can be utilized to variously gauge extrudate 10 throughout its width. The gauge of extrudate 10 is very precisely controlled by sheeting die 600 and can be controlled uniformly or nonuniformly throughout its width as desired and/or required by the finished product, within the range of between about 0.025 and 0.125 inches. It is believed that the present invention, has for the first time permitted the gauge to be so controlled by sheeting die 600 in the horizontal or axial extrusion of highly filled compliant materials inline.

As indicated, the backing material should have a specified melt strength value. This value has been determined using the following test procedure. The compounded backing material is prepared as required, for feeding a Brabender 1¼" single screw extruder having a L/D of 30/1, in communication with an adaptor for a 12 inch wide flexible lip sheeting Johnson Die having a 0 to 0.150" die lip which is run open (0.150" opening). The extruder and die are controlled in a manner to maintain the temperature of the extrudate at exit from the die at about 390° F. The test procedure runs the backing material through the die at about 50 lbs/hr by maintaining the screw speed at 100 rpm. The extrudate is passed through three, twelve-inch by four-inch diameter temperature controlled rolls, which rolls are kept at temperatures of about 120° F. and are arranged vertically and gapped to produce a 0.6 lbs/ft$^2$ density sheet when rotating at the same rate to accept the extruded sheet. The extrudate passes between the nip or gap created by the two uppermost rolls (first nip set) wrapping around the middle roll in an inverted "S" routing and passing between the nip or gap created by the two lowermost rolls (second nip set) wrapping around the lower roll from which the extrudate is stripped. The roll set of the second nip set is "open" and fixed in a manner such that it contacts the initially extruded material. The first nip set is adjusted by cranking down the uppermost roll to a point at which a polish is obtained upon passing the extrudate through the first nip set. After the rolls are thusly adjusted, the roll speed of the three rolls is increased to the fastest point at which the stripped extrudate remains nonporous (without formation of holes) as determined by visual inspection. The extrudate has thus been drawn down to the thinnest sheet at which it maintains its integrity. A six-inch square sheet is then removed from the drawn down sheet to determine the melt strength as a measure of pounds per square foot of material which is preferably not more than about 0.15 and more preferably not more than about 0.10 as indicated above. The greater the melt strength of the material the lesser its density and thus, a material having a high melt strength approaches a zero density.

In operation of the preferred embodiment of the present invention, a master controller (not shown) to which feeders 100 are slaved is set to the desired rate of production which is at least about 4500 pounds per hour and more preferably at least about 6500 pounds per hour and the feeders 100 set to the proportional percentage (by weight) of individual ingredients to be introduced into extruder. The master controller sequences the introduction of filler (calcium carbonate) as follows: at start up the ingredients (not including filler or oil) are fed into feed hopper 205 which feeds same centrally of and into co-rotating screws 220 until they are progressed through zone I, the master controller then triggers entry of the filler through feed hopper 205 and into screws 220 as above; and at shutdown the master controller first stops feeder 155 (the filler) and then the remaining feeders 100. The master controller also commences introduction of the oil which is heated to about 150° F. prior to introduction into port 210 upon the initial progression of the ingredients (absent the filler) through zone III. As described in detail hereinbefore, the ingredients are starve fed to extruder 200 which operates at a screw speed of from about 210 to 315 to 350 rpm as the production rate varies from about 4500 lbs/hr to 7000 lbs/hr to 7500 lbs/hr. Extruder 200 is designed to substantially completely disperse the materials throughout while keeping same at temperatures below degradation levels and preferably below about 400° F. and more preferably below about 380° F., the volatization point of the stearate. The compounded materials are progressed to diverter system 400 which includes a three-way-valve for dumping same until such time as the mix is within plus or minus ¼ (one-quarter) percent of the set proportional percentages whereupon the mix is progressed through gear pump 500 and through die 600 forming gauged sheet 10 having a melt strength of at least about 0.15. The process of the present invention is believed to enhance these qualities of the gauged sheet by maintaining the melted/compounded disparate elements at substantially uniform temperatures from the point of melting through extrusion through sheeting die 600. Precoated carpet 20, which has been found can be precoated with a polyethylene or EVA precoat, is generally pre-heated via unit 650 to a temperature of about 150° F. prior to being contacted with backing material 10 by the action of rolls 710 and 720 which are gapped to perform such contacting without the formation of a puddle at the nip. This action likewise has been found to permit the use of cheaper, more viscous precoated materials since the pressure of rolls 710 and 720 in combination with the heat of extrudate 15 and pre-heated precoated carpet 20 act to force such a precoat (e.g. the polyethylene or EVA) into the bundles of the carpet fibers to further penetrate same. The backing material 10 is thus substantially horizontally extruded from and gauged by sheeting die 600 for its marriage to precoated carpet 20, inline to form a composite backed carpet 15.

The compositions of examples I and VI are only exemplary and it should be understood that a number of highly filled compositions are contemplated by the present invention consistent with the above processing parameters. For example, it has been found that the compositions must have a satisfactory melt strength value preferably not more than about 0.15 as outlined above. The backed carpet 15 which may vary from about 0.030 to 0.120 inches in thickness and from about 40 to 200 ounces per square yard, should throughout these ranges comprise a compliant carpet having a flexibility of from about 10 to 30 as measured by Tinius Olsen Stiffness Tester 88600. This test does not entirely reflect the compliancy of carpet since compliance or flexibility of the backing of carpet varies with density, softness of the material and the like. For example, by controlling the density of the carpet, one can reduce the thickness without reduction in the density to increase the compliance of the carpet. Also, the softness of the material can be controlled, and, for example, a material having a shore A hardness of less than about 85 would be acceptable. In the preferred embodiment, compliance is controlled by both thickness of the backing material and its softness.

Suitable fillers for the blends of the present invention are selected from the group consisting of calcium carbonate, barium sulfate, aluminum trihydrate, talc, clay, wood flour and the like. A highly filled yet compliant backing can be fabricated by using a filler having a relatively high specific gravity which results in a thinner more compliant backing material. For example, by using barium sulfate (SpG. 4.3) in place, the same weight percentage of calcium carbonate (Sp.G 2.7) a thinner more compliant backing sheet would result.

The present invention, however, as it pertains to use in automotive carpets, presents other problems. Increased amounts of filler result in poor pad adhesion which renders backing sheet 15 unsuitable for automotive application absent wholesale use of costly spray adhesives. In the preferred embodiment, the highly filled composition of the present invention will include a tackifying resin as is known in the art. Heretofore, additions of tackifiers to pelletized blends would not permit shipping and/or inventorying such blends for commercial application to carpet. The present invention permits the addition of tackifying resins and other materials which render the backing sheet tackier and/or more compliant by permitting the continuous feeding of such elements into the extruder for the inline sheet extrusion of backing material for lamination with carpet.

As was heretofore pointed out, an effective amount of processing oil, such as a hydrocarbon oil is essential to the present invention during compounding. Hydrocarbon oils such as naphthenic and paraffinic oils are suitable. The particular oil should have a low volatile component content at temperatures of extrusions as encountered in extruder 200 and be compatible with the polymeric materials, the resins, elastomers, and fillers required in the blend. Suitable commerically available paraffinic oils are Sunpar 2280, Flexon 815 and Flexon 580, Sunpar and Flexon being trademarks for a series of petroleum oils marketed by Sun Oil Company and Exxon Company respectively. In the preferred embodiment, the effective amount of oil is defined as that amount of oil sufficient to permit the kneading blocks to form a melt from the highly filled thermoplastic blend, yet not so much as to carry the filler too far into the melting or kneading zones without forming a sufficient melt and thus causing the extruder to lock-up or stop. While the exact amount of lubricant is believed to vary with the amount of filler in the blend, it is believed that the effective amount of oil will range from about 2.0 to 10.0 weight percent of oil, and more preferably from about 3.0 to 6.0 percent.

It has further been found essential to include an effective amount of stearate in the composition, this term being used to encompass suitable fatty acid esters including oleates and stearates, with stearic acid being preferred. Specific stearates include zinc and calcium stearate. A suitable stearate available commercially is Industrene R from HumKo. An effective amount of stearate is needed to yield a suitable automotive carpet backing material, preferably having an elongation of at least about 100 percent, and more preferably having an elongation of at least about 200 percent. While this ingredient is not believed essential to the processability of the present invention, it has been found to reduce the power consumption of extruder 200 by 25 percent. On the other hand, excessive amounts of stearate tend to volatize from the extruded backing sheet rendering the backed carpet unsuitable. The preferred amount of stearate to accomplish these ends is believed to be in the range of between about 0.25 and 2.0 percent.

The following examples are set forth as a further illustration of the present invention and its applications. The various blends set forth are exemplary and not to be considered as limiting. It will be apparent that many modifications and variations can be effected without departing from the scope of the present invention.

EXAMPLES I-VI

| BLEND | I | II | III | IV | V | VI* |
|---|---|---|---|---|---|---|
| CaCO$_3$ | 77.0 | 70.0 | 67.0 | 67.0 | 68.0 | 67.0 |
| Elvax 460[1] | 2.0 | — | — | — | — | — |
| Ultrathene 621[2] | — | — | 14.0 | 14.0 | — | 14.0 |
| EY 902[3] | 4.0 | — | — | — | — | — |
| LD 401[4] | — | 6.7 | — | — | 12.0 | — |
| Ultrathene 612[5] | — | — | 7.0 | — | — | 7.0 |
| Elvax 420[6] | 2.0 | 3.3 | — | 7.0 | 3.0 | — |
| Butyl 065 rubber[7] | 2.0 | — | — | — | — | — |
| Vistalon 3708[8] | 6.0 | 10.0 | 6.0 | 6.0 | 8.0 | 6.0 |
| Stearic acid | 1.0 | 1.0 | 1.0 | 1.0 | 1.0 | — |
| Sunpar 2280[9] | — | 9.0 | — | — | 6.0 | — |
| Flexon 815[10] | — | — | 4.0 | 4.0 | — | 4.0 |
| Sunthene 4240[11] | 6.0 | — | — | — | — | — |
| Escorez 1102[12] | — | — | 1.0 | 1.0 | 2.0 | 1.0 |
| Cohesive Strength | 1.35 | 0.61 | 0.78 | .97 | 0.90 | 1.19 |

EXAMPLES I–VI-continued

| BLEND | I | II | III | IV | V | VI* |
|---|---|---|---|---|---|---|
| (less than) | | | | | | −1.48 |

[1] DuPont tradename for ethylene vinyl acetate ("EVA") having 18% vinyl acetate and a 2.5 melt index ("MI")
[2] U.S. Industrial Chemical tradename for EVA having 18% vinyl acetate and a 2.5 MI
[3] U.S. Industrial Chemical tradename for EVA having 40% vinyl acetate and a 70.0 MI
[4] An Exxon designation for EVA having 9% vinyl acetate and a 3.0 MI
[5] U.S Industrial Chemical tradename for EVA having 18% vinyl acetate and a 150 MI
[6] DuPont tradename for EVA having 18% vinyl acetate and a 150 MI
[7] Exxon designation for a non-vulcanized butyl rubber
[8] Exxon designation for a non-vulcanized EPDM rubber
[9] Sun Oil tradename for a paraffinic processing oil
[10] Exxon tradename for a paraffinic processing oil
[11] Sun Oil tradename for a napthenic processing oil
[12] Exxon tradename for a hydrocarbon tackifying resin
*Dusted with $CaCO_3$ The foregoing formulations are useful in fabrication of both compliant automotive and contract carpets.

EXAMPLES VII–X

The apparatus as depicted in FIG. 1 was set to operate at the below referenced rates and under the below specified conditions for the fabrication of carpeting by feeding disparate materials to the compounding extruder having a screw design as depicted in FIG. 2 for the inline backing of carpet. Disparate elements in the following weight percentages were fed to extruder 200 through feed hopper 205 except as indicated otherwise: 16.8% Elvax 460; 5.0% Vistalon 3708; 0.8% Stearic Acid; 71.0% $CaCO_3$; 3.0% Elvax 420; and a 3.4% Flexon 815 (feed through port 210). The carpet was first precoated by extruding the indicated material onto the back of carpet and passing same between nip rolls where after it was processed and backed as heretofore described under the following conditions.

| | VII | VIII | IX |
|---|---|---|---|
| Master Controller (kgs/hr) Goods | 2000 | 2700 | 3047 |
| Preheater 650 volts/temp °F. | 90/230 | 90/260 | 91/270 |
| Nip Gap inches-mils (between rolls 710 & 720 at each end) | 155/65 | 155/65 | 155/65 |
| Nip Pressure psi | 75 | 75 | 75 |
| RPM Gear Pump | 17.5 | 24 | 27 |
| Roll 710 temp °F. | 68 | 75 | 86 |
| Roll 720 temp °F. | 95 | 86 | 94 |
| Line Speed ft/min | 22.4 | 29.2 | 32.7 |
| Precoat (Polyethylene) oz/yd² | 6.0 | 5.8 | 5.8 |
| Nip Gap inches-mils (range) (Precoater-not shown) | 25/40 | 25/40 | 25/40 |
| Nip Pressure psi (Precoater) | 90 | 90 | 70 |
| Melt Temp (Precoater Extruder) °F. | 446 | 446 | 446 |
| HEAT EXCHANGER SETTINGS BACK-COATING EXTRUDER Zones | | | |
| II–III (in/out) | 230 | 225/220 | 225/220 |
| IV–VI (in/out) | 160 | 160/155 | 160/155 |
| VII–VIII (in/out) | 150 | 160/160 | 160/160 |
| Transition 300 (in/out) | 160 | 160/160 | 160/160 |
| Valve 400 Gear Pump (in/out) | 185 | 185/130 | 185/130 |
| Backing Extruder | | | |
| RPM | 210 | 290 | 315 |
| Vacuum in.Hg. | 12 | 19. | 19 |

Example VII is representative of standard settings at an extrusion production rate of 2000 kgs/hr of backing material laminated with precoated carpet 20 to form automotive carpet. Examples VIII and IX relate to increased production levels.

What is claimed is:

1. A continuous process for the sheet extrusion of a highly filled, thermoplastic, elastomeric material for the inline backing with carpet, by feeding disparate materials into a compounding extruder, comprising the steps of:
    inventorying said disparate materials for continuous feeding into said compounding extruder;
    starve feeding said disparate materials including a predetermined amount of fillers of at least about 65% by weight of said disparate materials and an effective amount of oil into the first zone of said compounding extruder;
    conveying said disparate materials from said first zone through a second zone while maintaining the temperature in said second zone at at least about 120° C. to insure conveyance of said starve fed materials without plugging;
    kneading said disparate materials in a third zone in a manner which forms a homogeneous melt, substantially disperses said materials throughout said melt, and substantially uniformly maintains the melt stream temperature of said melt below about 205° C. and the degradation temperature of said disparate materials;
    venting said product of said kneading step in a fourth zone by applying a vacuum; and
    extruding said vented product through a sheeting die forming a substantially void-free extrudate.

2. The process of claim 1, wherein said compounding extruder further comprises a pumping means for feeding an extrusion die, said pumping means having a suction zone, a compression zone and a discharge zone, further comprising the step of pumping said vented product into said sheeting die while maintaining the pressure at said discharge zone at a level sufficient to fill said sheeting die while maintaining the pressure at said suction zone to substantially uniformly maintain said melt stream temperature.

3. The process of claim 2, wherein said pressures at said suction zone are no more than about 100 psi.

4. A continuous process as in claim 2, for the operation of extrusion means of the twin screw compounding type so as to produce an extrudate of a highly filled, compliant thermoplastic, material suitable for lamination as backing with carpet, comprising the steps of:
    gauging said extrudate by maintaining an effective pressure of extrusion at said discharge zone of said pumping means of at least about 1000 psi to completely fill said sheeting die with said vented product; and
    continuously withdrawing extrudate from said sheeting die without distortion and pressing said gauged extrudate together with the carpet to be backed between a pair of rolls nipped at the final predetermined thickness of said backed carpet to form an integral backed carpet.

5. The process of claim 4, wherein said carpet if pre-coated and married with said gauged extrudate to form an integral backed carpet without building a puddle at said rolls.

6. The process of claim 4, wherein at least one of said rolls comprise a cooling can, further including the step of cooling and removing said integral backed carpet from said rolls.

7. The process of claim 2, wherein said disparate materials are continuously delivered to said compounding extruder in predetermined ratios and in predetermined amounts, said feeding step further including first feeding said filler at a predetermined time commencing after said other disparate materials are fed to said compounding extruder and removing, prior to said backing of said carpet, the materials which do not contain said predetermined amount of filler.

8. The process of claim 3, wherein said sheeting die includes adjustable lips further including the steps of gauging said extrudate non-uniformly throughout its width in the range of from about 0.025 to 0.125 inches and horizontally withdrawing said non-uniformly gauged extrudate from said sheeting die wherein said integral backed carpet also varies in thickness in proportion to said non-uniformly gauged extrudate.

9. The process of claim 2 further including the step of heating said effective amount of oil prior to said feeding into said compounding extruder.

10. The process of claim 1 further comprising the step of removing moisture from said homogeneous melt prior to said extruding step whereby said homogeneous melt has a moisture content of not more than about 0.10%.

11. The process of claim 1, wherein the melt stream temperature is maintained below about 205° C.

12. A twin screw intermeshing, co-rotating, compound extruder, wherein each of said screws comprise first and second shafts mounted for rotation within said extruder, each of said shafts having corresponding screw sections mounted thereon in intermeshing relation wherein the screw designs for each shaft include a first zone consisting of 120/60, 160/160/SK and 160/160/SK screw sections, followed by a second zone consisting of 160/80/SK-N, 160/160 and 160/80 screw sections, followed by a third zone consisting of three 120/120 screw sections, followed by a fourth zone consisting of kneading block sections consisting of three sections of KB/45°/5/80 block sections, followed by three sections of KB/45°/5/120 block sections, followed by a fifth zone consisting of 120/60, 120/20, 120/20, and 120/60 screw sections, followed by a sixth zone consisting of KB/45°/5/80, KB/90°/5/120, and KB/45°/5/80/LH block sections followed by a seventh zone consisting of two 160/160 screw sections followed by an eighth zone consisting of a 160/80 screw section followed by three 120/120 screw sections.

13. A twin screw intermeshing, co-rotating, compound extruder, wherein each of said screws comprise first and second shafts mounted for rotation within said extruder, each of said shafts having corresponding screw sections mounted thereon in intermeshing relation wherein the screw designs for each shaft include a feed zone consisting of 120/60, 160/160/SK and 160/160/SK screw sections, a conveying zone consisting of 160/80/SK-N, 160/160, 160/80 and 120/120 screw sections, a melting zone consisting of three sections of KB/45°/5/80 block sections, three sections of KB/45°/5/120 block sections, a group of 120/120, 120/160 and 120/60 screw sections, a section of KB/45°/5/80, KB/90°/5/120, and KB/45°/5/80/LH block sections, a venting zone consisting of two 160/160 screw sections, and a pumping zone consisting of a 160/80 screw section and three 120/120 screw sections.

14. A system for continuously (1) feeding disparate materials into a twin screw compounding extruder, (2) compounding said materials into a compliant thermoplastic mass and (3) extruding said thermoplastic mass in a molten state from said extruder in the form of non-porous integral continuous sheet comprising: (A) powered extrusion means of the twin screw compounding type; (B) feed means for continuously delivering a plurality of disparate materials making up a highly filled thermoplastic material having at least about 65 percent by weight filler to said extrusion means; and (C) compounding means for forming a homogeneous melt of said disparate materials for devolatizing said homogeneous melt, for pumping said devolatized homogeneous melt into a sheeting die and for continuously extruding said homogeneous melt as sheet extrudate having a melt strength of no more than about 0.15, while ensuring an effective temperature is maintained within said powered extrusion means, wherein said powered extrusion means further includes self lubricating gear pump means for pumping said devolatized melt into said sheeting die, said self-lubricating gear pump means further including a suction zone, a compression zone and a discharge zone wherein the pressure at said suction zone is not more than about 100 psi and the pressure at the discharge zone is not less than about 1000 psi.

* * * * *

UNITED STATES PATENT AND TRADEMARK OFFICE
CERTIFICATE OF CORRECTION

PATENT NO.   :   4,663,103
DATED        :   May 5, 1987
INVENTOR(S)  :   Robert W. McCullough, et al.

It is certified that error appears in the above-identified patent and that said Letters Patent is hereby corrected as shown below:

Column 17, Line 1: delete "if" and insert --is--

Column 17, Line 18: delete "3" and insert --2--

Signed and Sealed this

Twenty-ninth Day of December, 1987

*Attest:*

DONALD J. QUIGG

*Attesting Officer*   *Commissioner of Patents and Trademarks*